United States Patent
Chun et al.

(10) Patent No.: US 7,809,000 B2
(45) Date of Patent: *Oct. 5, 2010

(54) UPDATING NEXT-EXPECTED TSN AND RECEIVER WINDOW TO AVOID STALL CONDITIONS

(75) Inventors: Sung Duck Chun, Seoul (KR); Seung June Yi, Seoul (KR); Young Dae Lee, Hanam (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/406,355

(22) Filed: Mar. 18, 2009

(65) Prior Publication Data

US 2009/0180387 A1   Jul. 16, 2009

Related U.S. Application Data

(63) Continuation of application No. 10/985,774, filed on Nov. 9, 2004, now Pat. No. 7,593,407.

(60) Provisional application No. 60/518,325, filed on Nov. 10, 2003.

(30) Foreign Application Priority Data

Nov. 10, 2003   (KR) .................... 10-2003-0079216

(51) Int. Cl.
   *H04L 12/28*   (2006.01)
   *H04L 1/18*    (2006.01)
   *H04W 4/00*    (2009.01)

(52) U.S. Cl. ............... 370/394; 370/328; 714/748
(58) Field of Classification Search ............... None
    See application file for complete search history.

(56) References Cited

U.S. PATENT DOCUMENTS

2002/0107019 A1   8/2002   Mikola et al.
2003/0125056 A1   7/2003   Jiang

FOREIGN PATENT DOCUMENTS

| EP | 1343267 | 9/2003 |
|---|---|---|
| JP | 1999127107 | 5/1999 |
| JP | 2003530797 | 10/2003 |
| WO | 02096006 | 11/2002 |

OTHER PUBLICATIONS

Samsung, "MAC-hs Re-ordering Protocol Flushing Correction", 3GPP TSG-RAN2 Meeting #38, R2-032111, Oct. 6, 2003.

*Primary Examiner*—Nittaya Juntima
(74) *Attorney, Agent, or Firm*—Lee, Hong, Degerman, Kang & Waimey

(57) ABSTRACT

Updating the next-expected transmission sequence number (NET) or the receiver window position to ensure that the NET always falls within the receiver window range to prevent unnecessary delays in delivering data blocks in order to avoid stall conditions and achieve high speed data transmission capabilities for a high-speed downlink packet access (HSDPA) system.

19 Claims, 9 Drawing Sheets

(a)

(b)

(c)

☐ : Not Received

▨ : Received

▦ : Sent to Disassembly block (a)

(b)

(c)

(d)

☐ : Not Received

▨ : Received

▨ : Sent to Disassembly block

UPDATING NEXT-EXPECTED TSN AND RECEIVER WINDOW TO AVOID STALL CONDITIONS

CROSS-REFERENCE TO RELATED APPLICATIONS

This patent application is a continuation of U.S. Ser. No. 10/985,774, filed Nov. 9, 2004 and entitled "UPDATING NEXT-EXPECTED TSN AND RECEIVER WINDOW TO AVOID STALL CONDITIONS," now U.S. Pat. No. 7,593,407, issued Sep. 22, 2009, which claims the benefit of Korean Patent Application No. 10-2003-0079216, filed Nov. 10, 2003, and the benefit of U.S. Provisional Patent Application No. 60/518,325, filed Nov. 10, 2003, which are all hereby incorporated by by reference herein in their entireties.

FIELD OF THE INVENTION

The present invention relates to wireless (radio) communications, and in particular, to handling data blocks by updating a next-expected TSN and receiver window to avoid stall conditions.

BACKGROUND AND SUMMARY

The present invention relates to controlling a reordering buffer by a user equipment (UE) that employs a next-expected transmission sequence number (TSN) and a receiver window for a HSDPA (High-Speed Downlink Packet Access) system in a UMTS (Universal Mobile Telecommunications System), which is a European type IMT-2000 system, and more particularly, to controlling the reordering buffer to prevent stall conditions due to MAC-hs PDUs not being delivered to the upper layer when the next-expected TSN falls outside the receiver window range.

The UMTS (Universal Mobile Telecommunications System) is a third generation mobile communications system that evolved from the European GSM (Global System for Mobile Communications) system, with the purpose of providing further improved mobile communications service based upon a GSM core network and W-CDMA (Wideband Code Division Multiple Access) technology.

FIG. 1 depicts a typical UMTS network (100) architecture. The UMTS broadly consists of user equipment (UE 110), a UMTS Terrestrial Radio Access Network (UTRAN 120), and a core network (CN 130). The UTRAN consists of one or more radio network sub-systems (RNS 121, 122), and each RNS consists of one radio network controller (RNC 123, 124) and one or more base stations (Node Bs 125, 126) that are managed by the RNC. The Node B, being managed by the RNC, receives data sent from a physical layer of the UE via the uplink and transmits data to the UE via the downlink, to thus act as an access point of the UTRAN with respect to the UE. The RNC handles the allocation and management of radio resources, and acts as an access point with the CN.

An RNC that manages dedicated radio resources for a particular UE is called a serving RNC (SRNC 123), and an RNC that manages common radio resources for a plurality of UEs within one cell is called a controlling RNC (CRNC). Also, when the UE moves, all RNCs that the UE goes through (excluding the SRNC) are called drift RNCs (DRNCs 124). The drift RNCs 124 facilitate the routing of user data and allocate codes as common resources.

The interface between the RNC and the CN is called an Iu interface. The interface between the SRNC and the DRNC is called an Iur interface. The interface between the RNC and Node B is called an Iub interface. Each interface provides control data or data transmission services via a transport bearer. For example, the bearer provided in the Iub interface is called a Iub transport bearer, which provides control data or data transmission services between the RNC and Node B.

FIG. 2 depicts a radio interface protocol architecture based upon a 3GPP radio access network specification between the UE and the UTRAN. The radio interface protocol of FIG. 2 is divided horizontally into a physical layer, a data link layer, and a network layer, and is divided vertically into a user plane for data information transmissions and a control plane for transfer of control signaling. Namely, the user plane is the region in which traffic information of the user (such as voice, IP (Internet Protocol) packets, and the like) is transferred, while the control plane is the region in which control information (such as the interface of the network, maintaining and managing calls, and the like) is transferred. The protocol layers of FIG. 2 may be divided into a first layer (L1), a second layer (L2), and a third layer (L3) based upon the lower three layers of an open system interconnection (OSI) model that is a well-known in communications systems.

Each layer depicted in FIG. 2 will now be described in more detail. The first layer (L1) is a physical layer (PHY) that provides information transfer service to upper layers by using various radio transmission techniques, and is connected to a medium access control (MAC) layer that is located thereabove via a transport channel through which data travels between the MAC layer and the physical layer.

The MAC layer provides data transfer, reallocation of radio resources and MAC parameters. The MAC layer is connected to a radio link control (RLC) layer, which is an upper layer, via a logical channel, and various logical channels are provided depending upon the type of data that is transmitted.

In general, when information of the control plane is transmitted, a control channel is used. When information of the user plane is transmitted, a traffic channel is used.

The MAC layer is sub-divided into a MAC-b sub-layer, a MAC-d sub-layer (310), a MAC-c/sh sub-layer (320), and a MAC-hs sub-layer (330), according to the type of transport channel that is managed.

The MAC-b sub-layer manages a BCH (Broadcast Channel), which is a transport channel handling the broadcasting of system information.

The MAC-d sub-layer (310) manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each UE.

The MAC-c/sh sub-layer (320) manages a common transport channel, such as a forward access channel (FACH) or a downlink shared channel (DSCH), which is shared by a plurality of terminals. In the UTRAN, the MAC-c/sh sub-layer exists for each cell and is located in a controlling radio network controller (CRNC), and one MAC-c/sh sub-layer exists in each UE.

The MAC-hs sub-layer (330) performs the functions related to HSDPA (High-Speed Data Packet Access) such as packet scheduling, HARQ (Hybrid ARQ) operations, and the like.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC (Broadcast/Multicast Control) layer is located above the RLC layer, and schedules cell broadcast messages (referred to as 'CB messages', hereinafter) received from the core network, and broadcasts the CB messages to UEs located in a specific cell(s).

The PDCP (Packet Data Convergence Protocol) layer is located above the RLC layer, and allows the data transmitted through a network protocol (such as an IPv4 or IPv6) to be effectively transmitted on a radio interface with a relatively small bandwidth. To achieve this, the PDCP layer performs the function of reducing unnecessary control information used for a wire-line network, and this type of function is called, header compression.

There is a radio resource control (RRC) layer at a lowermost portion of the L3 layer. The RRC layer is defined only in the control plane, and handles the controlling of logical channels, transport channels, and physical channels with respect to establishment, reconfiguration, and release of radio bearers (RBs). The radio bearer service refers to a service that the second layer (L2) provides for data transmission between the terminal and the UTRAN in order to guarantee a predetermined quality of service by the UE and UTRAN. And in general, the radio bearer (RB) establishment refers to regulating the protocol layers and the channel characteristics of the channels required for providing a specific service, as well as respectively setting substantial parameters and operation methods.

When the RRC layer of a particular UE and that of the UTRAN are connected to allow RRC messages to be sent and received therebetween, that UE is said to be in RRC connected state. If there is no such connection, that UE is said to be in idle state.

The HSDPA system is based on WCDMA, supports a maximum speed of 10 Mbps, and provides shorter delay times and improved capacity compared to existing systems.

FIG. 3A shows a radio interface protocol structure for supporting a HSDPA system. A terminal (UE) and a network (UTRAN) respectively contain corresponding protocol layers. For example, the MAC layer is divided into a MAC-d sub-layer, a MAC c/sh sub-layer, and a MAC-hs sub-layer. At the network, the MAC-hs sub-layer can be positioned above the physical layer (PHY) of a Node B (base station). The MAC-c/sh and the MAC-d sub-layers are located in the CRNC and the SRNC, respectively. A new transmission protocol called the HS-DSCH frame protocol (FP) is used between the RNC and the Node B, or among the RNCs for the delivery of HSDPA data.

FIG. 3B also shows a more detailed terminal side MAC architecture for supporting the HSDPA system. As shown, the MAC layer is divided into a MAC-d sub-layer (310), a MAC-c/sh sub-layer (320), and a MAC-hs sub-layer (330).

The manner in which the MAC layer receives the data from the physical layer and delivers it to the RLC layer will now be described. The data block (MAC-hs PDU) delivered to the MAC-hs sub-layer (330) through the HS-DSCH (High-Speed Downlink Shared Channel) is first stored in one of the HARQ processes within the HARQ block (331). In which process the data block is stored can be known from the HARQ process identifier included in the downlink control signal.

The HARQ process, in which the data block is stored, transmits the NACK (Negative Acknowledgement) to the UTRAN when there are errors in the data block and requests the re-transmission of the data block. When no errors exist, the HARQ process delivers the data block to a reordering buffer (shown in FIG. 4) and transmits the ACK (Acknowledgement) to the UTRAN. The reordering queue distribution block (333) and the reordering blocks (334, 335) are employed to handle the data blocks delivered to the reordering buffer.

Multiple reordering buffers can exist per priority level. The HARQ process delivers the data block to the corresponding reordering buffer by using the Queue ID (identity) included in the data block. A significant characteristic of the reordering buffer is that it supports in-sequence delivery of data.

Data blocks are sequentially delivered to an upper layer based on a transmission sequence number (TSN). More specifically, when a data block is received while one or more previous data blocks are missing, the data block is stored in the reordering buffer and is not delivered to the upper layer. Rather, the stored data block is delivered to the upper layer only when all previous data blocks are received and delivered to the upper layer. The TSN is 6 bits in length and modulo operations are performed.

Typically, because several HARQ processes operate, a reordering buffer may receive data blocks out of sequence. Therefore, a reordering buffer must be employed so that the data blocks can be delivered to the upper layer in sequence.

When the data blocks (MAC-hs PDUs) are delivered to the upper layer, they are sent to a disassembly block (336, 337). This disassembly block disassembles the MAC-hs PDU (formed by a plurality of MAC-d PDUs combined together) and thus performs segmentation into MAC-d PDUs. Thereafter, the disassembly block delivers the corresponding MAC-d PDUs to the MAC-d sub-layer (310). A transport channel multiplexing block (312) in the MAC-d sub-layer (310) refers to the logical channel identifier (C/T field) included in each MAC-d PDU to deliver the MAC-d PDU to the RLC layer via the corresponding logical channel.

FIG. 4 depicts an exemplary transmission and reception procedure in a general HSDPA system. Here, the MAC-d PDU is actually stored in the transmission buffer, but for the sake of explanation, a MAC-hs PDU (=one or more MAC-d PDUs) is depicted. Also, the size of each MAC-hs PDU may be different, but are conceptually depicted to be of equal size Additionally, it is assumed that there are eight (8) HARQ processes.

In more detail, FIG. 4 depicts the procedures of transmission to the receiving side (receiver) when MAC-hs PDU with TSN=13 through TSN=22 are stored in the transmission buffer. First, the MAC-hs PDUs with relatively low TSN values are delivered to an empty HARQ process. Here, the MAC-hs PDU with TSN=13 being delivered to HARQ process #1, and the MAC-hs PDU with TSN=14 being delivered to HARQ process #8 are shown by way of example. Namely, the TSN is not related to the HARQ process number, and delivery to any empty HARQ process is performed.

When the HARQ process receives an arbitrary data block (MAC-hs PDU), the HARQ process transmits the data block to the receiving side in a specific TTI (transmission time interval) and stores the data block for re-transmission that might be performed later. Only one data block can be transmitted in a certain TTI. Accordingly, only one HARQ process is activated in a single TTI. The HARQ process that transmitted the data block informs the receiving side of its process number through a downlink control signal which is transmitted through a different channel than that of the data block.

The reason for matching the HARQ process of the transmitting side (transmitter) with the HARQ process of the receiving side is because a stop-and-wait ARQ method is used by each HARQ process pair. That is, HARQ process #1 that transmitted MAC-hs PDU with TSN=13 does not transmit another data block until this data block is successfully transmitted. Because a receiving side HARQ process #1 can know that data is transmitted thereto for a corresponding TTI through the downlink control signal, the receiving side HARQ process #1 transmits the NACK to the transmitting side through an uplink control signal when the data block is not successfully received within a defined transmission time interval (TTI). In contrast, when a data block is successfully received, the receiving side HARQ process #1 transmits the ACK to the transmitting side, and at the same time delivers the corresponding data block to the reordering buffer according to the priority (Queue ID).

The multiple reordering buffers can exist per priority level. The HARQ process checks the priority (Queue ID) included in the MAC-hs PDU and delivers this MAC-hs PDU to the reordering buffer according to the priority. The data block delivered to the reordering buffer is then delivered to the upper layer when all of the previous data blocks are successfully received. However, when one or more previous data blocks are not successfully received and delivered to the upper layer, the data block is stored in the reordering buffer. That is, the reordering buffer must support in-sequence delivery of data blocks to the upper layer. A data block that is not delivered to the upper layer is stored in the reordering buffer.

To illustrate the foregoing, FIG. 4 shows that when the MAC-hs PDU with TSN=14 is received but the MAC-hs PDU with TSN=13 is not received, the MAC-hs PDU with TSN=14 is stored in the reordering buffer (420) until the MAC-hs PDU with TSN=13 is received. When the MAC-hs PDU with TSN=13 is received, both data blocks are delivered to the upper layer in the order of TSN=13 and TSN=14. When the data blocks are delivered to the upper layer, they are disassembled in units of MAC-d PDUs and are delivered as described above.

However, during the transmission of data via radio (wireless) channels, certain PDUs may not be properly delivered from the UTRAN to the UE despite numerous re-transmissions. Particular MAC-hs PDUs that that are not delivered for a prolonged period of time causes the problems of degrading transmission efficiency of the HSDPA system. That is, although the HSDPA system was developed for high speed data communications, if one MAC-hs PDU is not properly received for a long time or permanently, this causes many subsequent MAC-hs PDUs remain in the MAC-hs buffer for a prolonged period of time without delivery, and thus the overall data transmission efficiency deteriorates and undermines the reasons for employing a HSDPA system.

In order to prevent the stalling of the MAC-hs PDUs, the HSDPA has adopted a stall avoidance method employing a window technique.

Before explaining the window-based stall avoiding method, the operation environment parameters used for the reordering buffer will first be explained.

The next-expected TSN (referred to as NET hereafter) refers to the immediately subsequent value after the TSN of the last PDU of the sequentially received MAC-hs PDUs. Namely, the NET refers to the TSN of the first MAC-hs PDU to be subsequently received in-sequence. Whenever a PDU having a TSN that equals the NET is received, the NET is updated. The initial NET value is set to zero (0).

The end point of the receive window (RcvWindow_UpperEdge) refers to the largest TSN value in the receive window of the reordering buffer. When a MAC-hs PDU first arrives at the receiving side, the end point (i.e., upper edge) is set as the value corresponding to the largest TSN among those of the received PDUs. The initial value of the upper edge of the receive window is set to 63.

The start point of the receiver window (RcvWindow_LowerEdge) refers to the smallest TSN value in the receiver window of the reordering buffer. The start point (i.e., lower edge) of the receiver window can be calculated by subtracting the receiver window size from the end point of the receiver window and adding 1 thereto (RcvWindow_LowerEdge= RcvWindow_UpperEdge−receiver window size+1).

The receiver window prescribes (regulates) the TSN values of the MAC-hs PDUs that may be received when the window position does not change. The receiver window includes the TSN values from the lower edge to the upper edge of the receiver window.

The size of the receiver window (Receive_Window_Size) refers to the range of the receiver window, and is established by an upper layer of the MAC entity.

In a window based stall avoidance method, the receiving side moves (updates) the receiver window upon receiving a MAC-hs PDU having a TSN that is larger than the RcvWindow_UpperEdge. For those MAC-hs PDUs with a TSN that is smaller than the RcvWindow_LowerEdge of the updated receiver window, the receiving side no longer waits (i.e., ends reception stand-by) for those MAC-hs PDUs that have not yet been received and the MAC-hs PDUs previously received and stored in the reordering buffer are delivered (transferred) to the upper layers, such that stall situations for the MAC-hs PDUs can be prevented.

FIG. 5 depicts a more detailed operation, which can be summarized as follows:

In step 510, a MAC-hs PDU with a transmission sequence number (TSN) having the sequence number (SN) (=a random number) value is received.

In step 520, the SN value is compared with the receiver window range, and if the SN value is within the range, the following step 530 is performed, but if outside the range, the following step 522 is performed.

In step 530, when the SN value falls within the receiver window range, this SN value is compared with the NET, and it is checked as to whether the MAC-hs PDU corresponding to this SN had been previously received. If this SN is smaller than the NET or if the MAC-hs PDU corresponding to this SN had been previously received, the received MAC-hs PDU (in step 510) is discarded (step 540). If this SN equals to or is greater than the NET, and if the MAC-hs PDU corresponding to this SN had not been previously received, the corresponding MAC-hs PDU is stored in the location indicated by the SN value (step 550). Then, the following step 560 is performed.

In previous step 520, if the SN value falls outside the receiver window range, the following steps (steps 522-528) are sequentially performed: The received MAC-hs PDU is stored in the reordering buffer at a location indicated by the SN value that is greater than the RcvWindow_UpperEdge, and the RcvWindow_UpperEdge value is updated to the SN value. Then, among the MAC-hs PDUs stored in the reordering buffer, those MAC-hs PDUs having a TSN value that is smaller than the RcvWindow_LowerEdge are delivered from the reordering buffer to a disassembly block. Also, the NET is updated to be the RcvWindow_LowerEdge, and the following step 560 is performed.

In step 560, all the MAC-hs PDUs starting from the MAC-hs PDU having a TSN=NET and up to the MAC-hs PDU that immediately precedes the first MAC-hs PDU that has not been received, are delivered to the disassembly block Here, "the first MAC-hs PDU that has not been received" refers to the MAC-hs PDU having the smallest TSN among all the not received MAC-hs PDUs having a TSN that is equal to or greater than the NET.

In step 570, the NET is updated to equal the TSN of the first not received MAC-hs PDU of the previous step 560.

According to the related art stall avoidance method using a window, the receiving side sets the NET value to 0 at the first initialization stage and the receiver window upper edge is set to 63. Thus, assuming that if the receiver window size is 32, based upon the definition of the receiver window, the initial receiver window is determined to have TSN values from 32 to 63. For the first MAC-hs PDU transmitted from the transmitting side, the TSN is set to 0 and for subsequently transmitted MAC-hs PDUs, the TSN values of 1, 2, 3, etc. will be sequentially used. If there are no losses in the radio (wireless) region, the very first MAC-hs PDU arriving at the receiving side would have a PDU with TSN=0.

However, because this MAC-hs PDU is located outside the receiver window defined previously, the receiving side advances the receiver window according to the TSN of the MAC-hs PDU. Thus, according to FIG. 5, the re-established (updated) receiver window is set to have a TSN from 33 to 0. Also, even though the receiving side actually expects to receive a MAC-hs PDU with TSN=1 (i.e., NET=1), there is a problem with the related art because the NET will be set to 33.

Additionally, an even greater problem occurs because even though a received MAC-hs PDU can be immediately delivered to the upper layer, such MAC-hs PDUs are not delivered to the upper disassembly block, but are accumulated in the reordering buffer, thus causing unnecessary delivery delays. Here, in order to deliver the MAC-hs PDU to the upper layer, all of the MAC-hs PDUs having a TSN that is smaller than the receiver window lower edge value (i.e., those MAC-hs PDUs with TSN=33 through 63) must be received, or alternatively, if the receiver window is moved due to a subsequently received MAC-hs-PDU, and the MAC-hs PDU with TSN=0 must be located at a point smaller (less) than the receiver window lower edge. This situation will also occur whenever a MAC-hs PDU having a relatively small TSN (such as TSN=0, 1, 2, 3, etc.) arrives at the receiving side during the initial operation of the receiver window. Accordingly, those MAC-hs PDUs that are sequentially received and that can be delivered to the upper layer unnecessarily remain in the reordering buffer to thus cause undesirable delivery delay situations.

Such unnecessary delivery delay situations do not only occur during the initial stages of HSDPA system operation.

If all the MAC-hs PDUs falling within the receiver window were properly received, the receiver window does not move and the NET is updated to be RcvWindow_UpperEdge+1. When the NET refers to RcvWindow_UpperEdge+1, and a MAC-hs PDU with NET=RcvWindow_UpperEdge+1 arrives at the receiving side, the receiving side newly adjusts the receiver window range (because this MAC-hs PDU falls outside the current receiver window range) such that the NET is updated to RcvWindow_LowerEdge, and this received MAC-hs PDU is stored in the reordering buffer. Even though this PDU was sequentially received and can thus be immediately delivered to the upper layer, the receiver window operation according to the related art does not deliver this MAC-hs PbU to the disassembly block, but stores it in the reordering buffer, causing an unnecessary delivery delay situation.

The above problematic situation is caused by the NET value being outside the receiver window. Also, the previously explained problem during the initial operation at the receiving side is caused by the NET value being outside the receiver window, whereby NET=0 but the receiver window range is set as TSN=32 to 63.

Whenever the NET value falls outside the receiver window, the receiving side stores the received MAC-hs PDU in the reordering buffer even though such may be immediately delivered to the upper layer, resulting in a delay in delivering the MAC-hs PDU.

Such delivery delays cause errors in the upper layer and/or result in severe service quality degradation.

DISCLOSURE OF THE INVENTION

A gist of the present invention involves the recognition by the present inventors of the drawbacks in the related art. Namely, the present invention has been developed to address and/or solve the problems of the related art, such that the NET value always falls within the receiver window to prevent unnecessary delivery delays of MAC-hs PDUs that occur in the related art, in order to achieve rapid data transmission capabilities for a HSDPA system.

To achieve this, the present invention adjusts the initial range of the receiver window such that the NET falls within the receiver window from the start of protocol operations. If the NET or receiver window is updated and the NET falls outside the receiver window, the NET or receiver window is re-updated such that the NET again falls within the receiver window. More specifically, the initial value of the receiver window upper edge is not set to be 63, but changed to 0 (such as the NET value) such that the NET falls within the receiver window range. Also, upon updating of the receiver window, if the NET value becomes smaller than the receiver window lower edge, the NET is re-updated to the TSN value of the receiver window lower edge, and if the NET value becomes larger than the receiver window upper edge, the NET is re-updated to the TSN value of the receiver window upper edge.

Here, it should be noted that if the NET becomes greater than the receiver window upper edge due to the initial protocol operation or upon NET updating, the non-limiting exemplary embodiment of the present invention provides that the receiver window upper edge is to be set as the NET. However, this is not mandatory, as the receiver window may be updated to various appropriate positions as long as the NET falls within the receiver window range. Namely, the setting of the receiver window upper edge to equal the NET is merely one example, as the receiver window lower edge may be set as the NET, and other values within the receiver window range may also be set as the NET.

BRIEF DESCRIPTION OF THE DRAWINGS

The features and advantages of the present invention will become more apparent from the following detailed description of the non-limiting exemplary embodiment(s) of the invention taken in conjunction with the drawings.

DETAILED DESCRIPTION

The present invention is described as being implemented in a W-CDMA mobile communications system. However, the present invention may also be adapted and implemented in communications systems operating under other types of communications.

Figure 1:
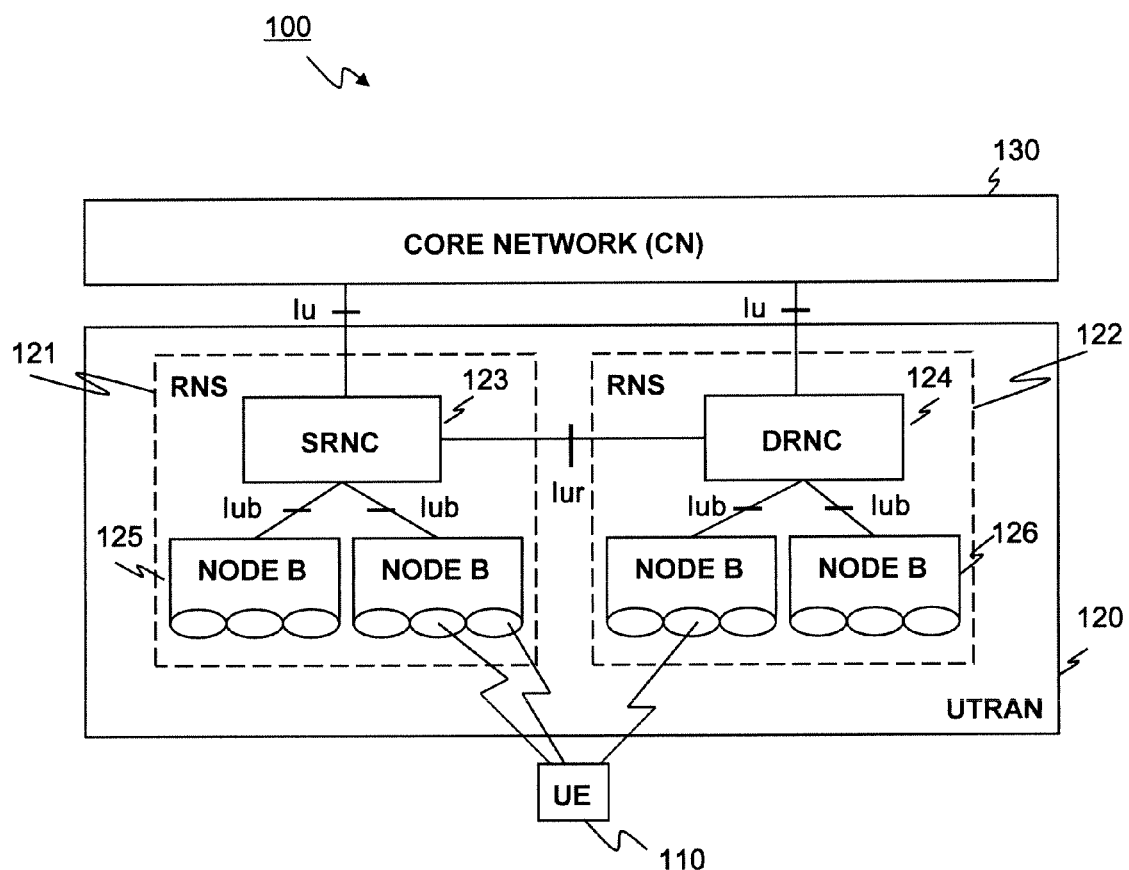
FIG. 1 depicts a general UMTS network architecture.
Figure 2:
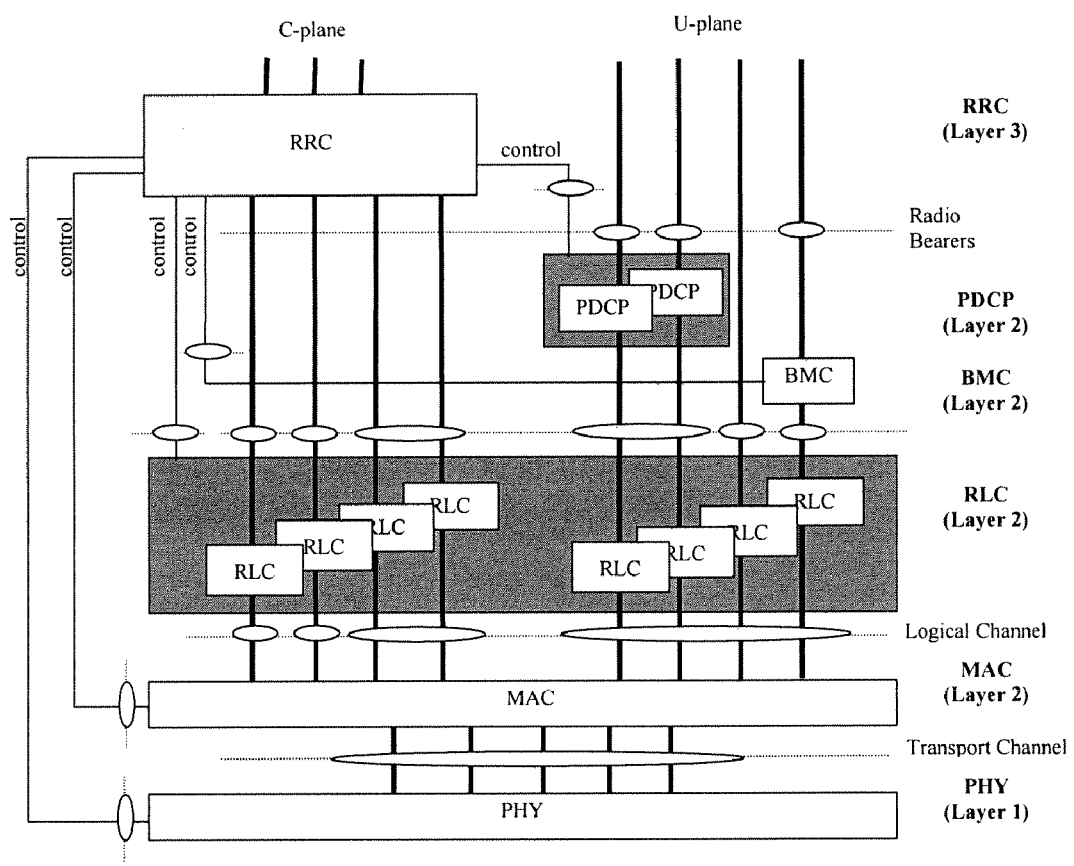
FIG. 2 depicts a radio (wireless) protocol structure.
Figure 3A:
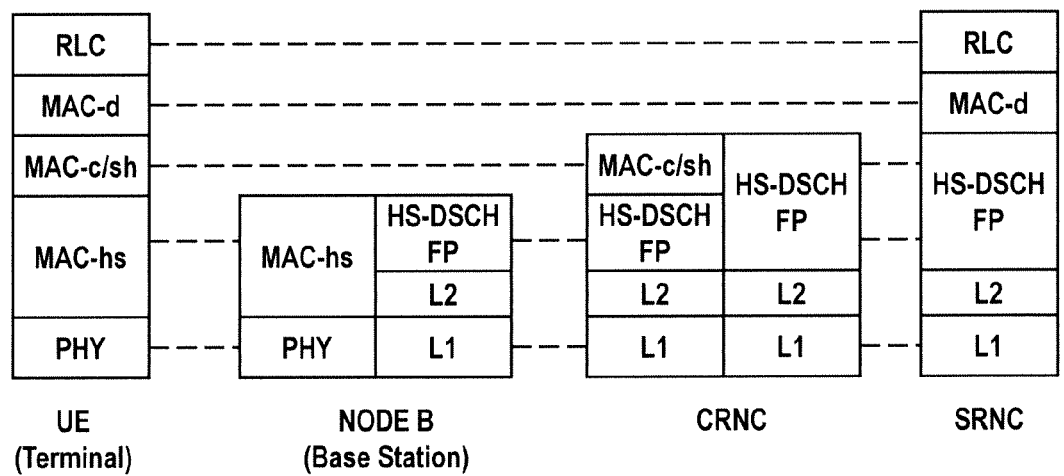
FIG. 3A depicts a radio interface protocol structure for supporting a HSDPA system.
Figure 3B:
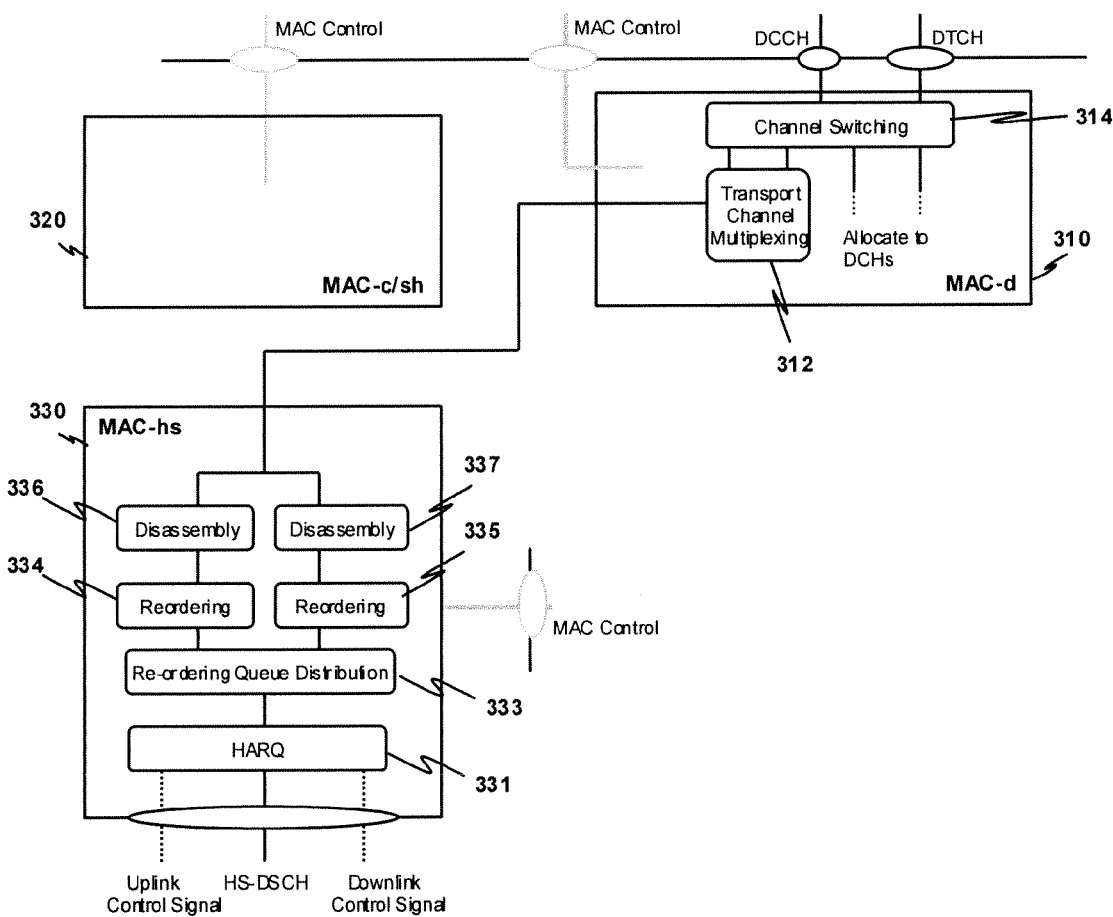
FIG. 3B depicts a MAC architecture in the UE for supporting HSDPA.
Figure 4:
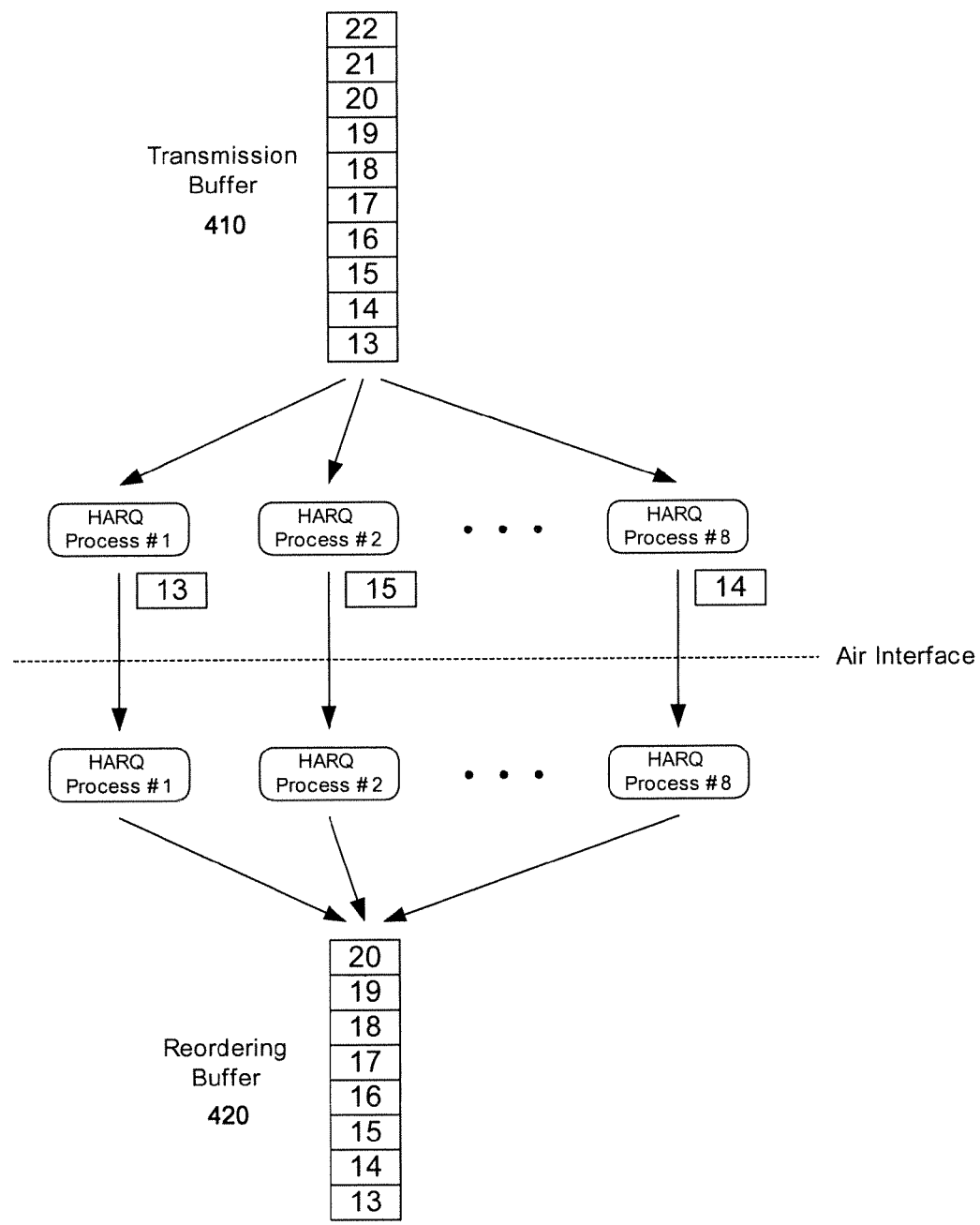
FIG. 4 depicts an example of a process for transmitting and receiving MAC-hs PDUs in a HSPDA system.
Figure 5:
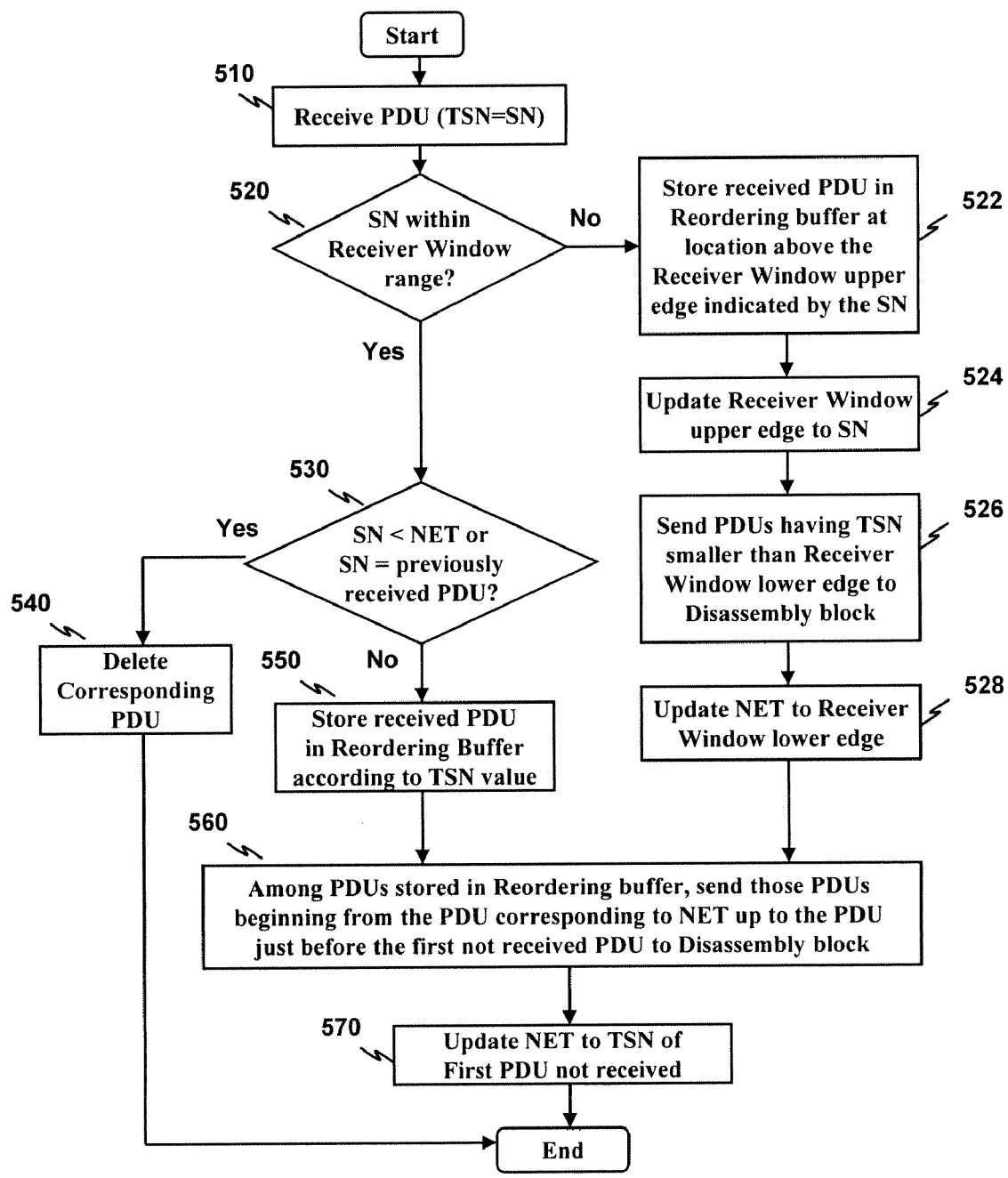
FIG. 5 depicts a window-based stall avoidance method according to the related art.
Figure 6:
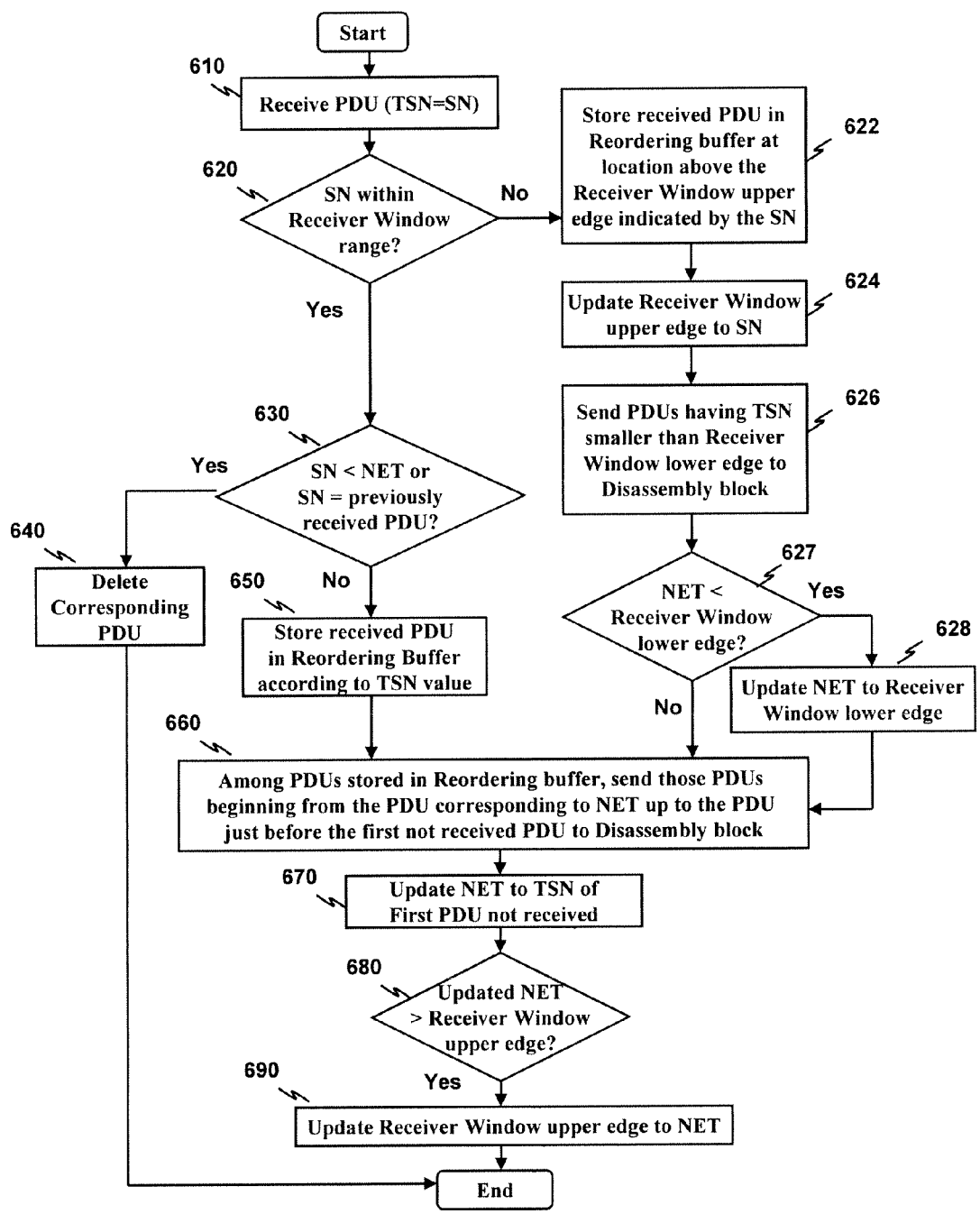
FIG. 6 depicts a window-based stall avoidance method according to one non-limiting exemplary embodiment of the present invention.

A non-limiting exemplary embodiment of the present invention is depicted in FIG. 6, which is an improvement over the related art procedures shown in FIG. 5.

In step 610, a MAC-hs PDU with a transmission sequence number (TSN) having the sequence number (SN) (=a random number) value is received.

In step 620, the SN value is compared with the receiver window range, and if the SN value is within the range, the following step 630 is performed, but if outside the range, the following step 622 is performed.

In step 630, when the SN value falls within the receiver window range, this SN value is compared with the NET, and it is checked as to whether the MAC-hs PDU corresponding to this SN had been previously received. If this SN is smaller than the NET or if the MAC-hs PDU corresponding to this SN had been previously received, the received MAC-hs PDU (in step 610) is discarded (step 640). If this SN equals to or is greater than the NET, and if the MAC-hs PDU corresponding to this SN had not been previously received, the corresponding MAC-hs PDU is stored in the reordering buffer at a location indicated by the SN value (step 650). Then, the following step 660 is performed.

In previous step 620, if the SN value falls outside the receiver window range, the following steps (622-628) are sequentially performed: The received MAC-hs PDU is stored in the reordering buffer at a location indicated by the SN value that is greater than the RcvWindow_UpperEdge, and the RcvWindow_UpperEdge value is updated to the SN. Then, among the MAC-hs PDUs stored in the reordering buffer, those MAC-hs PDUs having a TSN that is smaller than the RcvWindow_LowerEdge are delivered from the reordering buffer to a disassembly block. Also, the NET is compared with the RcvWindow_LowerEdge, and the NET is updated to be the RcvWindow_LowerEdge only when the NET is smaller than the RcvWindow_LowerEdge, and then the following step 660 is performed.

In step 660, all the MAC-hs PDUs starting from the MAC-hs PDU having a TSN=NET and up to the MAC-hs PDU that immediately precedes the first MAC-hs PDU that has not been received, are delivered to the disassembly block. Here, "the first MAC-hs PDU that has not been received" refers to the MAC-hs PDU having the smallest TSN among all the not received MAC-hs PDUs having a TSN that is equal to or greater than the NET.

In step 670, the NET is updated to equal the TSN of the first not received MAC-hs PDU of the previous step 660.

In step 680, the updated NET is compared with the receiver window upper edge value, and the receiver window is updated (step 690) only if the NET is greater than the receiver window upper edge value so that the receiver window upper edge value is matched with the NET, and the steps are completed.

In the above step 690, when the receiver window is updated, the receiver window upper edge can be set as the NET, but also, other points within the receiver window range can be set as the NET to achieve updating.

Figure 7A:
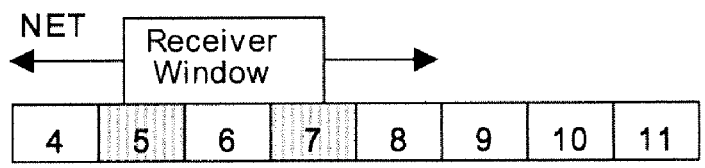
FIGS. 7A-7C depict an exemplary situation where the NET has become smaller than the receiver window lower edge value, according to one non-limiting exemplary embodiment of the present invention.
Figure 7B:
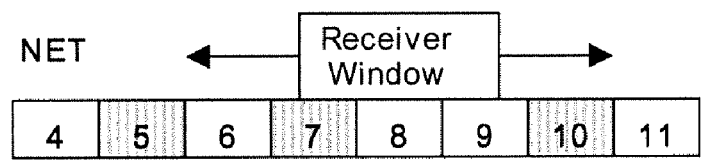
Figure 7C:
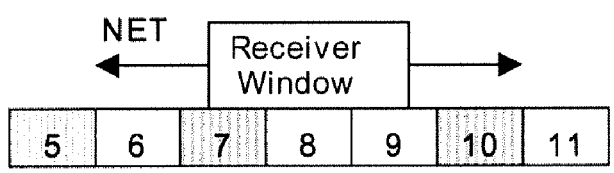

FIGS. 7A-7C depict the situation where the receiver window is moved due to the reception of a new PDU and the NET is smaller than the receiver window lower edge. Here, the exemplary situation assumes the receiver window size to be 5, the NET=4, and a MAC-hs PDU with TSN=10 is received, while a MAC-hs PDU with TSN=5 and a MAC-hs PDU with TSN=7 have already been received.

During the situation shown in FIG. 7A, a MAC-hs PDU with TSN=10 arrives. Here, because the PDU with TSN=10 falls outside the receiver window, the receiver window is moved as shown in FIG. 7B.

Any previously received PDU that falls outside the moved receiver window (i.e., a received PDU with TSN<RcvWindow_LowerEdge) due to the receiver window movement, namely, the MAC-hs PDU with TSN=5, is delivered to the upper layer. Also, because the NET is smaller than the receiver window lower edge value (i.e., NET<6), the NET is updated to 6 as shown in FIG. 7C.

FIGS. 8A-8D depict the situation where all PDUs within the receiver window have been successfully received and the NET is greater than the receiver window upper edge value. Here, it is also assumed that the receiver window size is 5, the NET=4, and a MAC-hs PDU with TSN=4 is received while the MAC-hs PDUs with TSN=5, 6, 7, 8 have been received.

Figure 8A:
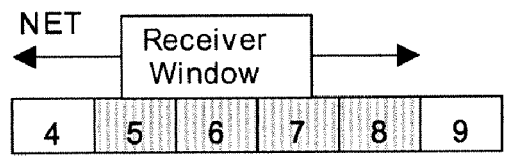
FIGS. 8A-8D depict an exemplary situation where all PDUs within the receiver window have been successfully received and the NET is greater than the receiver window upper edge value, according to one non-limiting exemplary embodiment of the present invention.
Figure 8B:
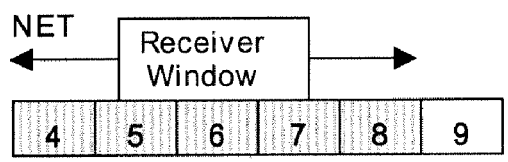

During the situation shown in FIG. 8A, a MAC-hs PDU with TSN=4 arrives. This MAC-hs PDU with TSN=4 is stored at position 4 in the reordering buffer as shown in FIG. 8B, and those PDUs starting from the MAC-hs PDU with TSN=4 up to the MAC-hs PDU with TSN=8 (which is the MAC-hs PDU just prior to the first MAC-hs PDU that has not yet been received (i.e., MAC-hs PDU with TSN=9)) are delivered to the disassembly block. Also, the NET is updated to 9.

Figure 8C:
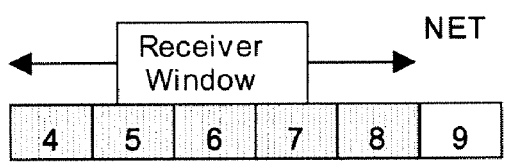
Figure 8D:
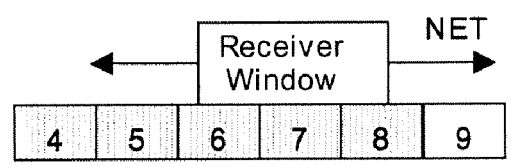

As in FIG. 8C, if the NET is greater than the receiver window upper edge value, the receiver window upper edge value is updated to the NET, and the receiver window is moved as shown in FIG. 8D.

When using the related art for HSDPA, even if the UE could immediately deliver the received MAC-hs PDU to the upper layer, prolonged storage in the reordering buffer causes unnecessary data delivery delays to occur. However, when the UE employs the present invention to update the NET value and the receiver window, and processes the MAC-hs PDUs accordingly, unnecessary data delivery delays are prevented, and thus data transmission errors can be avoided and high speed data transmissions are made possible.

The present invention provides a method of handling data blocks, comprising: receiving data blocks associated with a sequence number; processing the received data blocks in a receiver window; comparing a next-expected transmission sequence number (NET) with a range of the receiver window; and setting the NET or the receiver window such that the NET is within the receiver window, if the NET is found to be outside that range of the receiver window as a result of the comparison.

In the above method, the NET is a transmission sequence number (TSN) following the TSN of the last in-sequence data block received. Here, the TSN is an identifier for the transmission sequence number on the HS-DSCH, and the TSN is used for reordering purposes to support in-sequence delivery to a higher layer.

If the NET is above a receiver window upper edge, the NET is set as the receiver window upper edge, or the NET is set as any appropriate position within the receiver window range. If the NET is above the receiver window, the receiver window is updated to any appropriate position as long as the NET falls within the receiver window range.

If the NET is below a receiver window lower edge, the NET is set as the receiver window lower edge. If the NET is below the receiver window, setting the NET=receiver window upper edge value−receiver window size+1. Here, the NET is a variable managed by the receiving side, and the NET is updated upon the delivery to the disassembly entity of the data block with TSN equal NET. In the above method, the initial value of the NET is zero (0), and the data blocks are MAC-hs PDUs (protocol data units).

In the above method, the steps are performed for a HSDPA (high-speed downlink packet access) system, and the steps are performed to avoid stall conditions. Also, if the received data block associated with the sequence number had been previously received, the received data block is discarded.

The present invention also provides a method of processing data blocks, comprising: a first step of receiving a data block (PDU) having a sequence number (SN); a second step of comparing the SN with a receiver window range; a third step of delivering certain PDUs stored in the buffer, starting from the PDU having the NET up to the PDU just prior to the PDU not yet received, to a disassembly block; and a fourth step of updating the NET to equal the SN of the first PDU not yet received.

In the second step, if the SN is within the receiver window range, and if SN<NET (a next expected SN) or the PDU had been previously received, then discarding the PDU, and processing is ended, but if SN≧2 NET or the PDU had not been previously received, then storing the PDU in a buffer at location specified by the SN, and proceeding to a third step.

If the SN is not within the receiver window range, storing the PDU in a buffer at the location specified by the SN, updating the receiver window such that its upper edge=SN, delivering all PDUs with SN<a lower edge of the receiver window to a disassembly block, and checking whether the NET<the lower edge of the receiver window; if so, updating the NET to equal the lower edge of the receiver window, and proceeding to a third step, if not, proceeding to a third step.

The above method further comprising: after the fourth step, checking whether the updated NET>the upper edge of the receiver window, if so, setting the NET=the upper edge of the receiver window, and if not, processing is ended or repeating the procedures from the first step.

To implement the above procedures, the present invention can employ various types of hardware and/or software components (modules). For example, different hardware modules may contain various circuits and components necessary to perform the steps of the above method. Also, different software modules (executed by processors and other hardware) may contain various codes and protocols necessary to perform the steps of the above method.

Namely, as shown in FIGS. 1 through 4, the present invention provides an apparatus to handle data blocks, comprising: a receiving module to receive data blocks associated with a sequence number; a processing module to process the received data blocks in a receiver window; a comparing module to compare a next-expected transmission sequence number (NET) with a range of the receiver window; and a setting module to set the NET or the receiver window such that the NET is within the receiver window, if the NET is found to be outside that range of the receiver window as a result of the comparison by the comparing module.

Preferably, the modules are part of a MAC entity. Preferably, the modules are part of a MAC-hs entity. Preferably, the modules are part of a mobile station, a wireless handset, a network, a base station, a Node B or a RNC (radio network controller).

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

What is claimed is:

1. A method of handling data blocks in a mobile communications system, the method comprising:
    receiving a data block associated with a sequence number;
    determining whether the sequence number is outside a receiver window;
    updating the receiver window when it is determined that the sequence number is outside the receiver window;
    comparing a next-expected transmission sequence number (NET) with a range of the updated receiver window; and
    setting the NET, such that the NET is within the updated receiver window, if the NET is determined to be outside the range of the updated receiver window as a result of the comparison.

2. The method of claim 1, wherein the NET is a transmission sequence number (TSN) following the TSN of a last in-sequence data block received.

3. The method of claim 2, wherein the TSN is a TSN on a High Speed Downlink Shared Channel (HS DSCH).

4. The method of claim 2, wherein the TSN is used for reordering purposes to support in-sequence delivery to a higher layer.

5. The method of claim 1, wherein the NET is set as an upper edge of the updated receiver window if the NET is above the upper edge of the updated receiver window.

6. The method of claim 1, wherein the NET is set as any appropriate position within the range of the updated receiver window if the NET is above an upper edge of the updated receiver window.

7. The method of claim 1, wherein the receiver window is advanced to any appropriate position within the range of the updated receiver window if the NET is above the updated receiver window.

8. The method of claim 1, wherein the NET is set as a lower edge of the updated receiver window if the NET is below the lower edge of the updated receiver window.

9. The method of claim 1, wherein the NET is set equal to an upper edge of the updated receiver window minus an updated receiver window size plus 1 if the NET is below the updated receiver window.

10. The method of claim 1, wherein the NET is a variable managed by a receiving side.

11. The method of claim 1, wherein the NET is updated upon a delivery to a disassembly entity of the data block with a transmission sequence number (TSN) equal to the NET.

12. The method of claim 1, wherein an initial value of the NET is zero.

13. The method of claim 1, wherein the data block is a Medium Access Control-high speed (MAC-hs) protocol data unit (PDU).

14. The method of claim 1, wherein the method is performed for a high-speed downlink packet access (HSDPA) system.

15. The method of claim 1, wherein the method is performed to avoid stall conditions.

16. The method of claim 1, wherein the received data block is discarded if the received data block associated with the sequence number had been previously received.

17. An apparatus to handle data blocks in a mobile communications system, the apparatus comprising:
- a receiver for receiving data blocks associated with a sequence number;
- a comparing module to compare a next-expected transmission sequence number (NET) with a range of an updated receiver window;
- a setting module to set the NET, such that the NET is within the updated receiver window, if the NET is found to be outside the range of the updated receiver window as a result of a comparison performed by the comparing module; and
- a processor to process the received data blocks in a receiver window, control the comparing module to perform the comparison, and control the setting module to set the NET.

18. A method of processing data blocks in a mobile communications system, the method comprising:
- receiving a protocol data unit (PDU) having a sequence number (SN);
- comparing the SN with a receiver window range of a receiver window;
- if the SN is within the receiver window range:
    - discarding the PDU and terminating processing if the SN is less than a next expected SN (NET) or the PDU had been previously received, and
    - storing the PDU in a buffer at a location specified by the SN if the SN is greater than or equal to the NET or the PDU had not been previously received;
- if the SN is not within the receiver window range:
    - storing the PDU in a buffer at the location specified by the SN,
    - updating the receiver window, such that an upper edge of the receiver window is equal to the SN,
    - delivering all PDUs with the SN less than a lower edge of the receiver window to a disassembly block, and
    - updating the NET to equal the lower edge of the receiver window if the NET is less than the lower edge of the receiver window;
- delivering certain PDUs stored in the buffer, from a PDU having a value equal to the NET up to a PDU just prior to a PDU not yet received, to a disassembly block; and
- updating the NET to equal the SN of a first PDU not yet received.

19. The method of claim 18, wherein a transmission sequence number (TSN) is a TSN on a High Speed Downlink Shared Channel (HS-DSCH).

* * * * *